United States Patent Office 2,936,028
Patented May 10, 1960

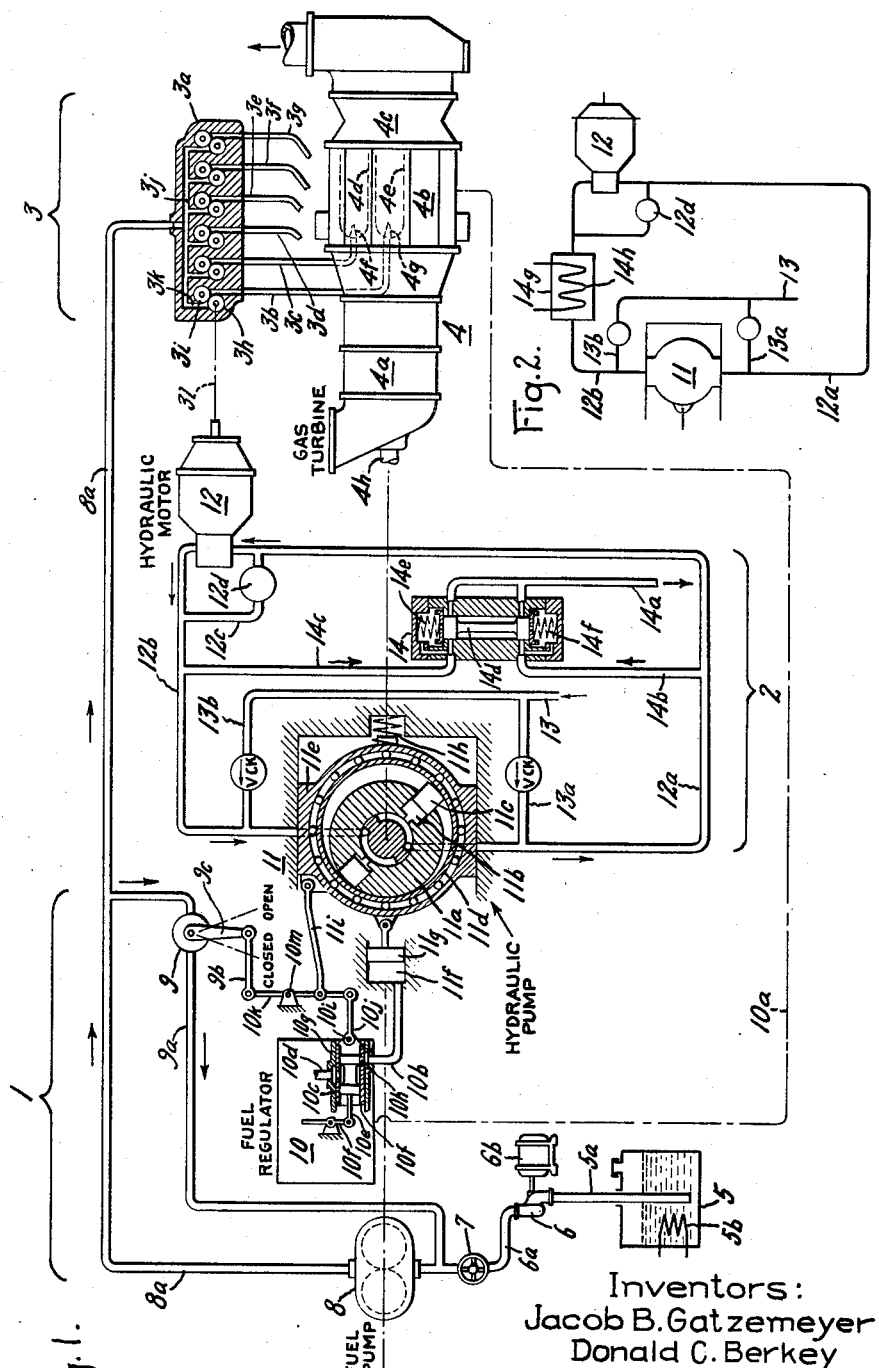

2,936,028

MULTI-NOZZLE GAS TURBINE FUEL SYSTEM WITH POSITIVE METERING DEVICES

Jacob B. Gatzemeyer, Schenectady, N.Y., Donald C. Berkey, Melrose, Mass., and Arne Loft, Scotia, N.Y., assignors to General Electric Company, a corporation of New York Application January 26, 1956, Serial No. 561,500

2 Claims. (Cl. 158—36.4)

This invention relates to fuel supply systems for thermal powerplants, particularly to a fuel system for a gas turbine powerplant having a number of combustion chambers each with a separate nozzle, requiring that fuel be supplied in equal quantities to the respective nozzles.

Instead of having a single large combustion chamber or "combustor" with a single fuel injection device, the modern gas turbine powerplant has generally been provided with combustion systems comprising a suitable number of similar smaller combustors. With such a system, fuel must be supplied in equal amounts to the respective fuel nozzles, in order to avoid substantial differences in the temperature of the hot gases delivered to the turbine rotor by the respective combustion chambers. Large differences in temperature, with the accompanying differential thermal expansions which take place, are a most important source of difficulty in the design of a gas turbine powerplant; and "hot spots" in the combustion system and turbine portions of the flow path are a most prolific source of service troubles and shortened life of the high temperature parts of the plant. Accordingly, it is exceedingly important to take all precautions that the fuel system of such a plant furnishes fuel in exactly metered quantities to the respective combustion chambers.

The precise control required involves the use of more or less complex valves and servo means for positioning them. In spite of their complexity, these control devices must be made very reliable, not subject to erratic operation in the event of normal wear over the life of the plant. The problem of providing such accurate control devices for a gas turbine fuel system becomes increasingly difficult when the fuel used is an inexpensive grade of "residual" fuel, such as that known to the trade as "Bunker C." This fuel is likely to have a substantial amount of entrained dirt, and has a tendency to produce deposits of a tough adhering varnish-like material. The entrained dirt results in excessive wear, and the "varnish" tends to cause sticking of relatively moving parts. Heretofore, these factors have led to the discard of various fuel systems which seemed to work satisfactorily in the laboratory but were found not reliable over a long period of operation in field service.

The object of the present invention is to provide an improved fuel system having special means for metering precisely measured quantities of fuel to the several combustion chambers of a gas turbine powerplant.

A further object is to provide a fuel system of the type described having minimum sensitivity to wear of critical parts due to dirt in the fuel being pumped.

A further object is to provide a gas turbine fuel system in which the fuel pumping function is separated from the fuel metering function, the critical metering devices and the main pumping means being relatively insensitive to the effects of wear, while the regulating means for controlling the metering function operates in a circuit of clean hydraulic oil, entirely independent of the dirt-bearing fuel.

Another object is to provide a system for pumping and metering Bunker C type fuel having no "dead-end passages" in which the viscous fuel might congeal.

A still further object is to provide a gas turbine fuel system in which accurate metering of the fuel is effected throughout the lift of the equipment, in spite of differing amounts of wear of the respective components of the system.

Still another object is to provide a gas turbine fuel system which is relatively simple and inexpensive, and comparatively easy to service and repair.

Other objects and advantages will become apparent from the following description taken in connection with the accompanying drawings, in which Fig. 1 is a diagrammatic representation, with principal components in section, of a gas turbine plant having a fuel supply and regulating system in accordance with the invention, and Fig. 2 is a diagrammatic representation of one modification of the means for cooling the oil in the hydraulic control circuit.

Generally stated, the invention is practiced by pumping the viscous dirt-carrying fuel oil by an oversized main pump the wear of which is relatively unimportant to the functioning of the system, while the precise metering function is performed by a plurality of separate positive displacement metering devices, one associated with each fuel nozzle, with a variable speed transmission driving the metering devices in a predetermined relation to the operating conditions of the gas turbine.

Referring now more particularly to Fig. 1, this fuel system comprises main fuel pump means indicated generally at 1, a variable speed transmission indicated generally at 2, and special positive displacement fuel metering means shown at 3.

The gas turbine proper is shown generally in outline at 4, and comprises an axial flow compressor 4a, a combustion system 4b, and a turbine section 4c. The combustion system comprises a plurality of separate cylindrical combustors, each having a cylindrical "liner" defining the combustion space proper, into which a fuel spray is delivered by a suitable nozzle. In two of the combustors shown in Fig. 1, the liners are indicated in dotted lines at 4d, 4e as having the respective fuel spray nozzles 4f, 4g. While others may be employed, these combustors may be of the general type disclosed in Nerad Patent 2,601,000, issued June 17, 1952 and assigned to the assignee of the present application. Likewise, the fuel nozzles may be of various appropriate types, for instance the air-atomizing nozzles disclosed in the patent to Buckland and Berkey, 2,595,759, issued May 6, 1952 to the assignee of the present application.

The main fuel pumping mechanism identified 1 comprises a fuel reservoir 5 connected by conduit 5a to a priming pump 6, which discharges through conduit 6a containing shut-off valve 7 to the main fuel pump 8. The viscous Bunker C oil may be heated to proper viscosity by a suitable heater 5b. The priming pump 6 may either be driven by suitable gearing from the shaft of the gas turbine, or by a separate motor as illustrated at 6b in the drawing. The main pump 8 discharges through conduit 8a to the metering device 3. The discharge pressure is conduit 8a is controlled by a bypass valve 9 in a conduit 9a, which returns a variable quantity of fuel from the discharge conduit 8a to the suction side of the pump 8, in a manner which will be apparent from Fig. 1.

The function of the main fuel pumping assembly 1 is to provide fuel at a pressure according to a definite schedule, as dictated by the characteristics of the fuel nozzles 4f, 4g and effected by the bypass valve 9 and regulator 10. The main fuel regulator, which is indicated diagrammatically at 10, is a more or less complex device for integrating one or more condition-responsive signals received from the gas turbine plant and combined to produce a single output signal, which is a function of the rate of fuel supply desired for particular operating conditions. This regulator 10 may take many forms, for instance that of the hydraulic-mechanical-electrical regulating means illustrated in the patent to Edwards, Garr, and Ogle, No. 2,622,393, issued December 23, 1952, or the patent to Starkey, Lewis, and Edwards, No. 2,558,592, issued June 26, 1951. Other equivalent regulators could be used; and it need only be noted here that the regulator 10 is a device for receiving, and putting out a signal proportional to, one or more "input signals" representing operating conditions of the gas turbine 4, as indicated by the broken line 10a. The output signal from regulator 10 may be a fluid pressure communicated to conduit 10b, as modulated by a pilot valve 10c, to which operating liquid at a suitable pressure is supplied through inlet conduit 10d. The longitudinally slidable spindle 10e of this pilot valve is connected to be positioned by means represented by the lever 10f, as controlled, through means not shown, by the operating conditions communicated through line 10a.

The pilot 10c is arranged to slide longitudinally in a bushing 10f, which in turn slides in the housing 10g. It will be appreciated by those familiar with hydraulic servo mechanism that bushing 10f has an inlet port which is always in communication with the supply conduit 10d; and a discharge port 10h cooperates with the right-hand land of pilot 10c to regulate the flow of operating liquid to and from the hydraulic servo cylinder 11f. The right-hand end of the intermediate bushing 10f is pivoted at 10i to a link 10j which is in turn pivoted to the lower end of a lever member 10k. Lever 10k is carried on a fixed pivot 10m, and is pivoted at its upper end to a link 9b which positions the operating handle 9c of by-pass valve 9. Movement of pilot 10c to the right uncovers port 10h, and hydraulic fluid causes piston 11g to move pump slider member 11e to the right. Link 11i causes lever 10k to pivot counterclockwise about pivot 10m, and link 9b moves valve handle 9c clockwise, to effect closing of valve 9 and thereby increase the pressure of fuel supplied to the metering device 3. Meanwhile, movement of lever 10k counterclockwise has caused bushing 10f to move to the right so that pilot 10c again blocks off port 10h. Conversely, movement of pilot spindle 10c to the left causes the hydraulic operating liquid in cylinder 11f to drain through port 10h past the right-hand end of pilot member 10c, with the result that spring 11h biases the pump member 11e to the left, so that follow-up link 11i causes lever 10k to pivot clockwise about pivot 10m, moving the valve operating lever 9c counterclockwise to the "open" position. This causes the pressure of the fluid in 8a to decrease, thus reducing the fuel supply pressure to the metering device 3.

It is to be particularly noted that the linkage 11i, 10k, 9b positively interconnects the bypass valve 9 with the pump slider member 11e. Thus there is a definite correlation between the position of the bypass valve 9 and the displacement of the hydraulic pump 11. As noted above, the precise schedule of effective flow areas through the valve 9 may be altered, in relation to the position of pump member 11e, by suitable design of the interconnecting linkage or by the interposition of a suitably shaped cam member, or equivalent mechanical expedients.

Passing over the variable speed transmission 2, for the moment, the metering device 3 comprises a housing 3a having a single inlet port to which the total fuel flow is supplied by conduit 8a. A plurality of discharge ports communicate with separate fuel supply conduits identified 3b, 3c, 3d, 3e, 3f, 3g. It will be understood, of course, that each of these conduits communicates with a separate fuel nozzle, 3b supplying nozzle 4g, and 3c supplying nozzle 4f, etc. The function of the metering device or "flow divider" 3 is to sub-divide the main fuel flow received through conduit 8a into exactly equal quantities of fuel supplied to the separate spray nozzles, 4f, 4g, etc. This is accomplished by a plurality of independent positive displacement fluid metering devices. These may take many forms but are illustrated here as each comprising a positive displacement gear type pump each having a driving gear shown at 3h meshing accurately with a driven gear 3i. Fuel is supplied to each of these gear pump metering devices from a manifold passage 3j, communicating by way of the respective branch conduits, one of which is identified 3k.

Use of the simple well-known type of gear pump as the metering means facilitates manufacture with the required degree of accuracy to insure that each device supplies precisely the same quantity of fuel to the respective discharge conduits 3b . . . 3g, for each revolution of the common driveshaft 31. In spite of extreme care in manufacture, there will inevitably be some very small leakage paths through these metering devices, and normal manufacturing tolerances will result in these leakage paths being of slightly different effective sizes. Furthermore, the dirt entrained in the fuel will cause a certain amount of normal wear during the life of the equipment, and the degree of wear on the respective metering devices may be unequal. This will of course tend to increase the differences in the leakage paths existing through the various meters. These leakage paths constitute orifices through which fuel will leak at different quantity rates of flow proportional to the respective sizes of the leakage paths. This leakage flow past the respective metering devices is not a dependable function of the rotational speed of the drive shaft 31, and therefore represents a source of inaccuracy.

To reduce or eliminate the effect of these leakage paths through the metering devices, it is important in the practice of the invention that the system be arranged so there is substantially no pressure drop from the inlet conduit 8a to the respective discharge conduits 3b . . . 3g. With zero pressure drop existing across the leakage paths in the metering devices, there will be no leakage flow to produce the inaccuracy described above. It follows that the effect of varying degrees of wear, and of different manufacturing tolerances, in the respective metering devices may be overcome by providing a system which will result in no pressure differential from the inlet conduit 8a to the discharge conduits 3b . . . 3g. Accordingly, it is the function of the valve 9, as controlled by regulator 10, to so vary the inlet pressure in conduit 8a relative to the speed of shaft 31 that the metering devices "freewheel," serving neither to pump the fluid to a higher pressure nor to be driven as a motor by the pressure fluid supplied through conduit 8a. There will then be neither a pressure rise nor a pressure drop across the metering devices.

It may be noted in passing that, under certain conditions, the positive displacement metering devices may do some pumping or "motoring." For instance, if one of the fuel nozzles should plug up, due to deposition of unburned carbon particles in the combustion chamber, then the metering device associated with that nozzle will automatically increase the discharge pressure to the extent required to cause the required quantity of fuel to flow through the plugged orifice in the fuel nozzle. This is because each of these positive displacement metering devices must pass the same quantity flow for each revolution of the shaft 31 (disregarding any "slip" or leakage), and the discharge pressure in the fuel nozzle supply conduit will therefore automatically increase, by reason of the pumping action of the metering device, so that a plugged nozzle will still pass the same quantity rate of flow as the other unplugged nozzles. It follows that, if more and more nozzles become plugged over a long operating period, greater power will be required to drive the shaft 31, due to the pumping work done by the metering devices supplying the plugged nozzles, and there will then be a pressure rise from the inlet conduit 8a to the respective discharge conduits. Conversely, any metering device which becomes excessively worn may have excessive "slip," due to leakage through the clearance spaces, in the event its fuel nozzle happens to become plugged, so that it will no longer supply the same quantity of fuel as the other metering devices. Thus it remains important either that the fuel nozzles be clean and of uniform characteristics, or that the metering devices be identical, within established limits, if the operating characteristic is to be as intended. As a practical matter, it is ordinarily unlikely that that fuel nozzle which happens to plug up will just happen to be associated with a metering device which has an excessive leakage path. Thus, the system will be relatively insensitive to variations in the leakage paths through the respective metering devices and to variations in the characteristics in the fuel nozzles.

The special transmission 2 for driving the shaft 31 of the flow divider 3 could perhaps employ various mechanical, electrical, or other variable speed devices; but a hydraulic system is used here because the versatility of the type of hydraulic drive shown makes it particularly well adapted for the wide range of speed and torque required. It is, however, to be understood that other equivalent variable speed devices might be used, so long as they are capable of driving the flow divider 3 at a speed which is a function of the signal pressure supplied by regulator 10.

The variable speed transmission shown in Fig. 1 comprises an infinitely variable positive displacement pump 11 driving a constant displacement hydraulic motor indicated diagrammatically at 12. It might, of course, be possible to use a fixed displacement pump driving a variable displacement motor; but, for reasons which need not be detailed here, it has been found desirable to use a variable displacement pump driving a fixed displacement motor, as shown.

The structural details of the variable displacement pump 11 are not material to an understanding of the present invention; but it may be noted generally that the pump shown is of a type having a rotor 11a defining a plurality of radial pumping cylinders 11b each containing a piston 11c caused to reciprocate by engagement with a reaction ring 11d carried in a slidable ring member 11e adapted to be positioned in eccentric relation to the rotor 11a. The eccentricity between the rotor 11a and reaction ring 11d determines the stroke of the pistons. As shown in Fig. 1, the eccentricity of member 11e is determined in accordance with a signal pressure communicated from regulator 10 by conduit 10b to a hydraulic servo motor consisting of a cylinder 11f containing a piston 11g connected to position the pump member 11e. Sliding motion of the pump member 11e to the right in accordance with the signal pressure in cylinder 11f is resisted by suitable return means such a spring 11h. It will be apparent that increase of signal pressure in cylinder 11f causes pump member 11e to shift to the right to increase the eccentricity and stroke of the pistons, while decrease of the signal pressure permits spring 11h to shift member 11e to the left to reduce the eccentricity and stroke. Increase in delivery rate of the pump 11 of course produces a corresponding increase in speed of the hydraulic motor 12.

It is also to be noted that the rotor 11a of pump 11 is coupled directly to, or is driven at a fixed speed ratio from, the rotor 4h of the gas turbine. Thus, it will be apparent that the speed of the hydraulic motor 12 is a joint function of the eccentricity of the reaction ring 11d, as dictated by the pressure signal supplied to servo cylinder 11f, and of the rotational speed of pump 11, corresponding to the rotational speed of the gas turbine rotor 4h. It follows that, even though the signal pressure supplied by regulator 10 remains the same, the speed of hydraulic motor 12 will increase or decrease as a direct function of changes in speed of the gas turbine rotor.

The significance of this will appear more clearly from a subsequent description of the method of operation.

As shown in Fig. 1, pump 11 is connected to hydraulic motor 12 by conduits 12a, 12b. If the rotation of pump member 11a is clockwise, then cylinder 11b will discharge through conduit 12a, while conduit 12b supplies returning liquid to the opposite cylinder. Thus, the normal flow of liquid in the hydraulic circuit is counterclockwise as indicated by the arrows.

As noted above, it is intended that the shaft 31 of the metering device 3 be driven at such a speed and the bypass valve 9 be so regulated that there will be neither a pressure rise nor a pressure drop across the metering devices, meaning that the hydraulic motor 12 is ordinarily called upon to deliver only the small amount of power required to overcome friction losses in the metering devices. Even this small power output will cause some slight heating of the oil in the hydraulic transmission. As those familiar with the art will appreciate, any change in temperature of the oil in the hydraulic circuit changes its viscosity and affects the operating characteristics of the pump-motor combination. Under those abnormal operating conditions when the motor 12 is called upon to deliver increased power, as when a particular metering device is called upon to overcome the resistance of a plugged fuel nozzle, the degree of heating in the hydraulic circuit increases.

In order to reduce the temperature of the hydraulic fluid, means are provided for bleeding a certain amount of oil from the circuit and simultaneously supplying cool makeup liquid. The means for accomplishing this comprises a supply conduit 13, which may for instance receive clean, cool oil under pressure from the lubricating system of the gas turbine 4. Conduit 13 communicates with both the inlet and discharge side of pump 11 by way of branch conduits 13a, 13b each provided with a check valve, as shown. The means for automatically bleeding hot oil from the circuit comprises a pressure responsive valve 14 controlling the discharge of hot oil through drain conduits 14b, 14c to drain conduit 14a.

The details of the valve 14 need not be described, since this device does not form part of our invention. It need only be noted here that valve 14 contains a plunger member 14d which is ordinarily centered by springs 14e, 14f, but is arranged to shift longitudinally as a function of any pressure difference occurring between conduits 12a and 12b. The plunger 14d is arranged to discharge hot oil from the hydraulic circuit 12a, 12b through conduit 14a. Since, as noted above, the pressure differential across motor 12 is a function of its power output, and therefore of the heating effect produced in the hydraulic circuit, the valve 14 will discharge a quantity of hot oil proportional to the amount of heating produced in the circuit. Whereupon, cool oil will be admitted past the check-valves in conduits 13a, 13b from supply conduit 13. It will be obvious that equivalent means may be employed for removing the heat generated in the hydraulic circuit. One such alternate is illustrated in Fig. 2 in which like reference numbers indicate the corresponding elements in Fig. 1. It will be seen that the difference is that the heat is removed by a suitable heat exchanger 14g, which has a coolant supplied to the cooling coil 14h.

The hydraulic power transmission circuit also contains a bypass conduit 12c with a pressure relief valve 12d, the function of which is merely to prevent the pressure difference across motor 12 from exceeding a predetermined safe maximum, thus limiting the power output of the hydraulic transmission.

Certain special factors concerning the design and operating characteristics of various components of the system may be noted. For instance, the main fuel pump 8 is selected of a capacity substantially greater than would be indicated by the maximum rate of fuel supply desired. For instance, the capacity of the pump may be 20 gallons per minute, whereas the maximum flow rate ever supplied to the fuel nozzles is 13 gallons per minute. Then, as the parts of pump 8 wear, it is possible, by suitable modification of the operating mechanism of bypass valve 9, to retain the desired pressure characteristics in supply conduit 8a irrespective of hydraulic slip in pump 8 due to the increased clearances. In this connection, it has previously been noted that the bypass valve 9 is of a type provided with suitable means, such as a specially contoured flow control member or a suitable operating cam (not shown) for positioning the flow control member so that the schedule of effective area of valve opening may be altered, as a function of operating lever position.

Bypass valve 9 is provided with suitably hardened parts in contact with the dirt bearing fuel in order to prevent wear, which might otherwise undesirably alter the operating characteristics of the valve. This is important since, as will be seen from the drawing, the valve 9 is the only regulating device subject to wear from the dirt carried in the fuel, the regulator 10 and pump 11 and motor 12 all operating in clean oil from the powerplant lubricating system.

A further important reason for making the operating mechanism of valve 9 capable of adjustment is that the pressure schedule in conduit 8a, as a function of the delivery of pump 11 and the resulting speed of motor 12, must be so selected that the desired minimum (i.e. zero) pressure differential across the metering devices in housing 3a will be obtained. It is a matter of routine engineering design to find the proper actuating mechanism for valve 9 and to so design or adjust it that the relation between the speed of meter device shaft 31 and fuel supply pressure will result in the desired elimination of pressure drop across the metering devices.

The priming pump 6 may supply liquid at a slight superatmospheric pressure, for instance 2 lbs. per square inch, to the inlet of the main fuel pump 8, the discharge pressure of which may, for instance vary from 20 lbs. per square inch to a maximum of perhaps 1,000 lbs. per square inch.

The fuel nozzles may be of any suitable type, but are preferably of a type having a low pressure drop, so as to have comparatively small changes in pressure across the fuel nozzle as a function of rate of flow. This facilitates design of the metering devices 3 and the bypass valve 9 in order to obtain the desired minimum or zero pressure drop across the metering devices.

The operation of this fuel system may be outlined briefly as follows.

When the powerplant is shut down, the spring 11h of pump 11 biases the reaction ring 11d to the zero stroke position, concentric with rotor 11a. During the starting cycle of the powerplant, the starting motor (not shown) causes rotation of shaft 4h, and pump 11 and the lubricating oil supply pumps (not shown) furnish operating liquid to the hydraulic regulator 10 and to the hydraulic transmission inlets 13, 14a. When the turbine rotor 4h reaches proper firing speed, the regulator 10 supplies a pressure signal through conduit 10b to the servo cylinder 11f, so the pump reaction ring 11d is moved to an eccentric position and the motor 12 begins to drive the fuel metering devices in housing 3a, to furnish the fuel required for firing. After combustion is initiated, the load on the turbine may be increased by increasing the signal pressure supplied by regulator 10 so as to increase the eccentricity of pump 11 and correspondingly increase the speed of motor 12.

By reason of the linkage interconnecting the pump slider member 11e with the operating lever 9c of the bypass valve 9, and by reason of the design of valve 9, the fuel supply pressure in conduit 8a will be so correlated with the rate of flow to the fuel nozzles that the pressure difference between conduit 8a and the nozzle supply conduits 3b . . . 3g will be as nearly zero as possible.

When the power developed by the hydraulic motor 12 increases to the point where the heat generated is likely to affect the operation of the pump-motor combination, the automatic valve 14 opens to bleed hot oil and cause cool oil to be admitted to the circuit. As noted above, any clogging of the fuel nozzles will result in increased power output of motor 12 and an increased amount of bleeding of hot oil from the hydraulic circuit 12a, 12b. When the power consumption of motor 12 reaches a preselected safe maximum, the pressure relief valve 12d opens to automatically limit the power output.

In the event sudden acceleration of the powerplant is called for, the operation is as follows. Pilot 10c moves to the right so the regulator 10 will increase the pressure signal to servo cylinder 11f, and pump slider 11e is positioned to the right to increase the pump output and thereby increase the speed of hydraulic motor 12. This instantaneous increase in pressure produces a pressure drop across the gear pump metering devices 3h, 3k, and therefore tends to drive them faster than the speed established by the hydraulic motor 12. Thus during acceleration, the metering device 3 transiently tends to "motor" so as to somewhat increase the rate of supply of fuel to the nozzles. After a slight time lag, the increased pressure signal to servo cylinder 11f causes the discharge rate of pump 11 to increase and thereby increase the speed of motor 12 to a value appropriate to the new operating condition. The transient pressure differential across the metering devices 3 then disappears. Thus, the direct mechanical interconnection between the pump member 11e and the bypass valve 9 serves to increase the rapidity with which the system responds to a call for increased fuel supply.

Conversely, in the event the regulator 10 suddenly calls for a decreased fuel supply, as during deceleration of a locomotive powerplant, the reduced pressure signal supplied to servo cylinder 11f eventually causes the pump-motor combination 11, 12 to drive the metering system 3 at a slower speed; but meanwhile the direct mechanical connection of pump member 11e to bypass valve 9 causes the valve to open so as to instantaneously reduce the fuel supply pressure in conduit 8a. However, the inertia of the gas turbine rotor 4h causes the pump 11 and motor 12 to transiently continue at their previous steady state speed, with the result that there is a temporary pressure differential in the reverse direction across the metering devices in housing 3a. This causes the metering devices at 3 to act as a brake on motor 12. This transient pressure rise across metering device 3 disappears when the motor 12 slows down to the new steady state condition called for by regulator 10.

For service in a powerplant where frequent and very rapid deceleration is required, as in a locomotive, it may be desirable to so arrange the pump 11 that the spring 11h is able to move the slider member 11e to the left past the "concentric" or zero delivery position so that the pump 11 discharges in the reverse direction, sucking oil from conduit 12a and delivering it to conduit 12b, with the result that motor 12 is driven in the reverse direction. This causes the metering devices in housing 3a to positively suck out oil remaining in the supply conduits 3b . . . 3g, and thereby prevent this residual oil from reaching the combustion system. Since the nozzle supply conduits 3b . . . 3g may be so long as to have a significant oil storage capacity, this quick removal of oil from these passages has a material effect in improving the rate of response of the powerplant to a sudden call for decreased output. In other plants, for instance one in which the gas turbine drives a generator in an electric generating system, this feature may not be required; and the "zero position" for the pump 11 could be that in which the reaction ring 11d is exactly concentric with the rotor 11a.

An advantage of the system is that, as will be apparent from the drawing, the viscous Bunker C fuel flows through circuits which have no "dead-end passages" in which the fuel might congeal and carbonize or deposit "varnish" or dirt. The fuel heating means represented by heating coil 5b in the tank 5 brings the fuel oil to the proper viscosity, and all parts of the fuel oil circuit are traversed by liquid in motion so that the fuel has no chance to cool and coagulate, and entrained dirt has no opportunity to settle out. Thus, the system is particularly adapted for use with low grade dirt-bearing fluid fuels which are difficult to pump because of their high viscosity.

It will be seen that the invention provides an improved gas turbine fuel system having simple but very effective means for precisely dividing the main fuel flow into separate streams for the respective spray nozzles, the fuel pumping function being separated from the precise regulating and control function, with a minimum of critical parts subjected to the effect of wear due to dirt in the fuel. The system maintains its desired operating characteristics over a long life with minimum changes due to differences in wear on the various metering devices.

While only one embodiment of the invention has been disclosed completely herein, it will of course be appreciated that numerous modifications and substitutions of equivalents may be made; and it is of course intended to cover by the appended claims all such modifications as fall within the true spirit and scope of the invention.

What we claim as new and desire to secure by Letters Patent of the United States is:

1. A fuel system for a thermal powerplant requiring equal flow through a plurality of fuel discharge conduits comprising first supply conduit means with main fuel pressure control valve means for supplying fluid fuel at a pressure varying as a function of total flow rate desired, a plurality of separate rotatable positive displacement metering devices for subdividing the main flow of fuel from said first conduit means and supplying separate equal portions to a plurality of fuel discharge conduits, a variable speed hydraulic transmission driving all of said metering devices at a common speed and comprising a variable displacement pump connected to supply motive liquid in a closed circuit to a hydraulic motor connected to drive said metering devices, said closed hydraulic circuit having no fluid intercommunication with the fluid fuel conduits, means for varying the speed of said hydraulic transmission comprising servo means connected to vary the delivery of said pump and simultaneously adjust said main fuel pressure control valve means, the means interconnecting the hydraulic transmission and main fuel valve being effective to correlate the main fuel supply pressure with the speed of the metering devices whereby the pressure of the fuel in each discharge conduit is maintained substantially equal to the fuel supply pressure in said first conduit, said hydraulic transmission being reversible and the speed-adjusting servo means being connected to cause the reversible transmission to drive the metering devices in a reverse sense to positively remove oil from the discharge conduits when the main fuel valve means is closed.

2. A fuel system for a thermal powerplant requiring equal flow through a plurality of fuel discharge conduits comprising means for supplying fluid fuel including a first main fuel conduit receiving fuel under pressure from a positive displacement pump with a bypass conduit connected to the discharge side of the pump and adjustable bypass valve means controlling flow through the bypass conduit to alter the fuel pressure in said main conduit, metering means subdividing the main fuel flow from said first conduit and supplying separate equal portions to a plurality of separate fuel discharge conduits, said metering means comprising separate rotatable positive displacement metering devices each connected to receive fuel from the main conduit and discharging to a separate fuel discharge conduit, motor means driving all of said metering devices at a common speed, means for varying the speed of said motor means, and linkage means directly interconnecting said speed varying means with said bypass valve, whereby the pressure of the fuel supplied to the metering devices is caused to change substantially instantaneously when the speed varying means is positioned to change the total fuel supply rate, in advance of a change in speed of said motor means.

References Cited in the file of this patent

UNITED STATES PATENTS

| | | |
|---|---|---|
| 2,278,493 | Samiran et al. | Apr. 7, 1942 |
| 2,599,680 | Weeks | June 10, 1952 |
| 2,750,734 | Anxionnaz et al. | June 19, 1956 |